United States Patent
Anglin et al.

(10) Patent No.: US 8,788,466 B2
(45) Date of Patent: Jul. 22, 2014

(54) EFFICIENT TRANSFER OF DEDUPLICATED DATA

(75) Inventors: Matthew J. Anglin, Tucson, AZ (US); David M. Cannon, Tucson, AZ (US); Howard N. Martin, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 905 days.

(21) Appl. No.: 12/186,239

(22) Filed: Aug. 5, 2008

(65) Prior Publication Data

US 2010/0036887 A1 Feb. 11, 2010

(51) Int. Cl.
*G06F 7/00* (2006.01)

(52) U.S. Cl.
USPC .......................................... 707/692

(58) Field of Classification Search
USPC ........... 707/692, 664, 635, 809, 690, 999.204
See application file for complete search history.

(56) References Cited

U.S. PATENT DOCUMENTS

| | | | |
|---|---|---|---|
| 5,479,654 A * | 12/1995 | Squibb | 707/695 |
| 5,699,549 A * | 12/1997 | Cho | 711/115 |
| 5,990,810 A | 11/1999 | Williams | |
| 6,523,019 B1 | 2/2003 | Borthwick | |
| 6,889,297 B2 * | 5/2005 | Krapp et al. | 711/159 |
| 6,934,714 B2 | 8/2005 | Meinig | |
| 7,043,727 B2 | 5/2006 | Bennett et al. | |
| 7,065,619 B1 | 6/2006 | Zhu et al. | |
| 7,092,956 B2 | 8/2006 | Ruediger | |
| 7,116,249 B2 | 10/2006 | McCanne et al. | |
| 7,143,091 B2 | 11/2006 | Charnock et al. | |
| 7,200,604 B2 | 4/2007 | Forman et al. | |
| 7,356,730 B2 * | 4/2008 | Ulrich et al. | 714/6 |
| 7,584,338 B1 * | 9/2009 | Bricker et al. | 711/162 |
| 7,908,436 B1 * | 3/2011 | Srinivasan et al. | 711/114 |
| 8,209,334 B1 * | 6/2012 | Doerner | 707/747 |
| 2002/0116402 A1 * | 8/2002 | Luke | 707/200 |
| 2005/0004954 A1 * | 1/2005 | Soule | 707/203 |
| 2005/0268068 A1 * | 12/2005 | Ignatius et al. | 711/202 |
| 2006/0036901 A1 | 2/2006 | Yang et al. | |
| 2007/0208788 A1 * | 9/2007 | Chakravarty et al. | 707/204 |

(Continued)

FOREIGN PATENT DOCUMENTS

| | | |
|---|---|---|
| WO | WO 2007/042954 A2 | 4/2007 |
| WO | 2006094367 A1 | 9/2009 |

OTHER PUBLICATIONS

G. Niklas Noren, "A Hit-Miss Model for Duplicate Detection in the WHO Drug Safety Database," Aug. 2005, 10 pages.
Lise Getoor, "Link Mining: A Survey," 2005, pp. 3-12.

(Continued)

*Primary Examiner* — Mohammed R Uddin
(74) *Attorney, Agent, or Firm* — Kunzler Law Group, PC

(57) ABSTRACT

One aspect of the present invention includes enabling the efficient transfer of deduplicated data between storage pools in a storage management system without unnecessary reassembly and deduplication of data objects. In one embodiment, the storage management system tracks deduplication information for the data chunks of data objects within an index at the storage management system level, in addition to tracking storage information for each data object within another index at the storage management system level. The data chunk deduplication information is then accessible by any storage pool. Accordingly, transfers of the data objects and data chunks of the data object are easily facilitated, even between non-deduplicating and deduplicating storage pools.

18 Claims, 4 Drawing Sheets

(56) References Cited

U.S. PATENT DOCUMENTS

| | | | |
|---|---|---|---|
| 2008/0005141 A1 | 1/2008 | Zheng et al. | |
| 2008/0155192 A1 | 6/2008 | Iitsuka | |
| 2008/0294660 A1* | 11/2008 | Patterson et al. | 707/100 |
| 2008/0294696 A1* | 11/2008 | Frandzel | 707/200 |
| 2009/0204636 A1* | 8/2009 | Li et al. | 707/103 Y |
| 2009/0204652 A1* | 8/2009 | Chikusa et al. | 707/204 |
| 2009/0319585 A1* | 12/2009 | Gokhale | 707/205 |
| 2010/0042804 A1* | 2/2010 | Ignatius et al. | 711/202 |

OTHER PUBLICATIONS

Andrew McCallum, "Extraction: Distilling Structured Data from Unstructured Text," ACM Queue, Nov. 2005, pp. 49-57.

Jack G. Conrad, "Online Duplicate Document Detection: Signature Reliability in a Dynamic Retrieval Environment," 2005, pp. 443-452.

Periklis Andritsos, "Information-Theoretic Tools for Mining Database Structure from Large Data Sets," Jun. 2004, 12 pages.

PCT/EP2009/060139 Written Opinion and International Search Report dated Nov. 25, 2009.

\* cited by examiner

EFFICIENT TRANSFER OF DEDUPLICATED DATA

FIELD OF THE INVENTION

The present invention generally relates to data deduplication activities in a data storage management system. The present invention more specifically relates to the operation of a method and a system of efficiently transferring deduplicated data within a storage management system that provides a repository for computer information that is backed up, archived, or migrated from client nodes in a computer network.

BACKGROUND OF THE INVENTION

The basic premise of a data deduplication system is that data stored into the system must be analyzed, broken into pieces (commonly referred to as "chunks"), duplicate chunks identified (each unique chunk is given a digital signature strong enough to declare that two chunks with the same signature are actually the same data), and duplicate chunks eliminated. Normally, as the deduplication system breaks apart larger objects into chunks, it must keep track of the individual chunks which make up the larger object, so the larger object can be retrieved when desired.

Deduplication reduces space requirements by eliminating redundant chunks of data objects and replacing them with links or pointers to the single remaining chunk. Generally speaking, there must be some type of index or database to keep track of the chunks of a larger object so that the larger object can be reassembled and retrieved after deduplication has removed the redundant chunks. Furthermore, the database used to track the chunks is generally embedded within in the deduplication system. In other words, the deduplication system knows about its objects and chunks, but does not generally share this chunk information with any other system.

The deduplication system may be embodied in a storage management system that spans multiple storage volumes and storage pools. For example, data may be sent by storage management clients or data protection agents to the storage management server for storage. One characteristic of a storage management system is that data can be copied for redundancy, transferred to a new media type, or moved to reclaim unused space from deleted objects. Data redundancy and deduplication, in fact, work well together in a storage management system, because the more data that is deduplicated, the more important it is to have some backup copies of the data within the storage management system to help protect overall data integrity.

A storage management system typically stores copies of objects on separate media, so that loss of a piece of media due to a hardware error or other failure will not compromise the data within the storage management system. Alternatively, data can be moved from one storage location to another, either within the same storage pool or between storage pools. However, moving data between storage pools in conventional deduplication systems requires that the deduplicated data be re-assembled into an entire data object before transfer, and then possibly deduplicated once again after transfer to the target location back into deduplicated chunks. This re-assembly and repeat deduplication processing is resource intensive and inefficient.

What is needed is a method to efficiently transfer deduplicated data between storage pools in a storage management system without the need to re-assemble and deduplicate data chunks unnecessarily.

BRIEF SUMMARY OF THE INVENTION

One aspect of the present invention enables the efficient transfer of deduplicated data between storage pools in a storage management system without requiring the reassembly and deduplication of data chunks. In one embodiment of the present invention, data from data objects is deduplicated into a number of data chunks and stored within a storage management system. The storage management system accordingly contains a number of storage pools, and the data objects are stored in deduplicated or non-deduplicated form on any number of these storage pools.

To enable the efficient transfer of deduplicated data between storage pools in a storage management system, the storage management system tracks deduplication information for each data chunk within an index at the storage management system level, in addition to tracking storage information for the data object within another index at the storage management system level. Thus, when data chunks are deduplicated within one of the storage pools, the deduplication information for these chunks will be accessible by any of the other storage pools within the storage management system. This deduplication information can be used in conjunction with the storage information of the data objects to easily transfer data throughout pools within the storage management system.

In another embodiment of the present invention, a method for performing an efficient transfer of deduplicated data within a storage management system includes the similar steps of tracking the deduplication information for the data chunks at a storage management system-level and tracking the storage information for the data objects at a storage management system-level. However, in this embodiment, the data object is deduplicated and stored in deduplicated form on one or more storage pools, while enabling the data chunks to be potentially stored in non-deduplicated form in one or more storage pools concurrently or at a later time.

In this embodiment, because deduplication information for the data object is accessible on a storage management system-level, data chunks can be easily transferred to and from any combination of deduplicated and non-deduplicated storage pools. When a data transfer is initiated at a later time from a source storage pool to a target storage pool, the deduplication and reassembly information of the data object is retrieved from the deduplication information index. If the data object to be transferred from the source storage pool is deduplicated, the storage information for the data object is also retrieved from the storage management index If the target storage pool is a deduplicating pool, entries are simply added to the storage information index for data chunks of the data object. The data chunks needed to transfer the data object are then transferred from the source storage pool to the target storage pool. Thus, if the target storage pool employs deduplication, the transfer of data chunks from the source storage pool to the target storage pool is performed only for data chunks not already existing within the target storage pool.

DETAILED DESCRIPTION OF THE INVENTION

Figure 1:
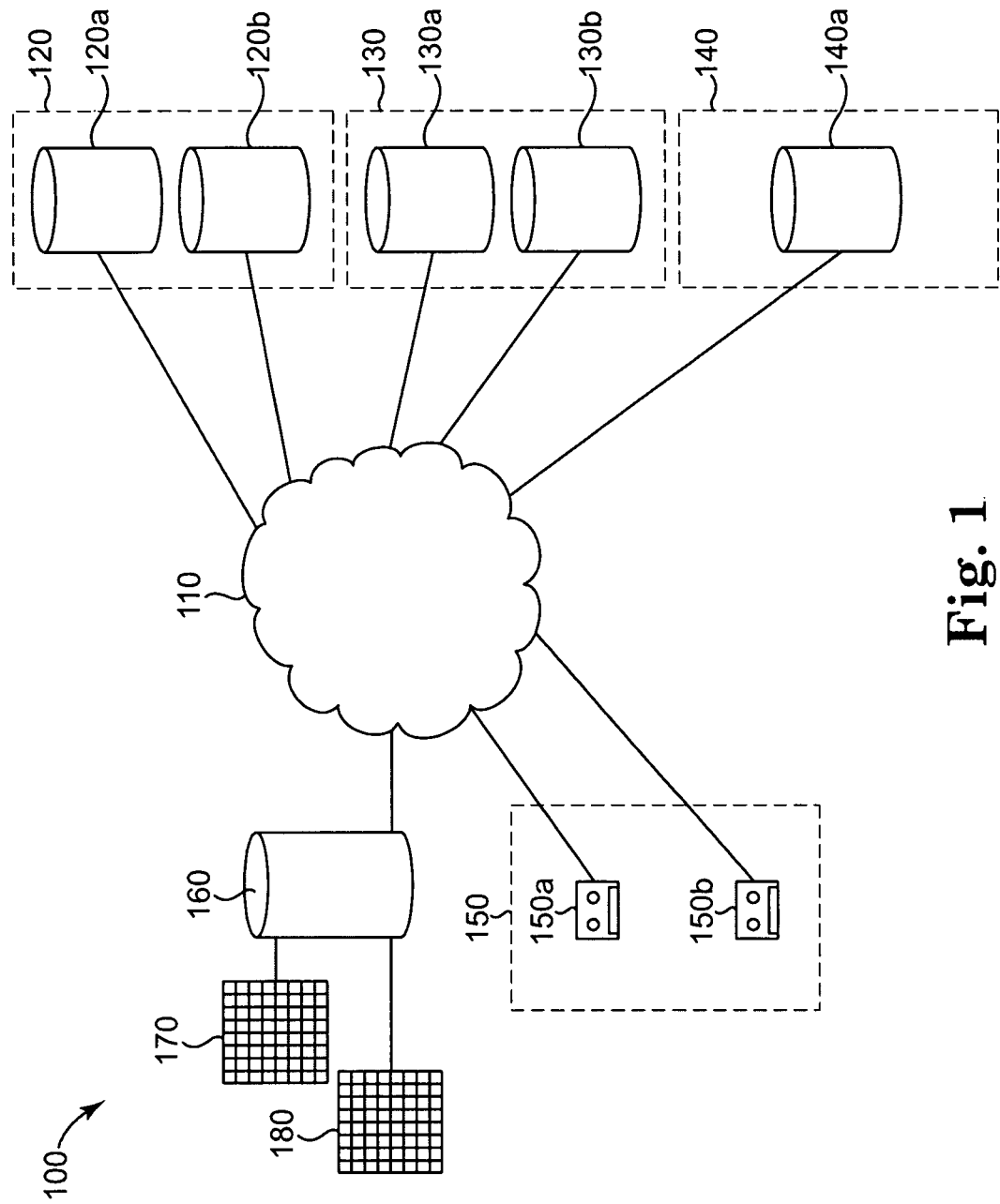
FIG. 1 illustrates an example operational environment of a storage management system according to one embodiment of the present invention.

One aspect of the present invention includes enabling the efficient transfer of deduplicated data between storage pools in a storage management system without the need to re-assemble and unnecessarily deduplicate data chunks. In one embodiment of the present invention, efficient transfer of data between storage pools is facilitated by storing deduplication information on a storage management system level, rather than at the deduplicating pool level. Even though some storage pools within the system may deduplicate data and other storage pools may not, the information relevant to deduplication activities is stored at a higher, storage management system level. This enables data to be segregated within distinct pools of the storage management system, while facilitating the flexibility to move individual chunks from one storage pool to another and preserve the integrity of each pool individually and the system collectively.

A storage pool is broadly defined as a set of volumes that have similar characteristics, such as physical, segmentation, or redundancy characteristics. For example, a storage management system may have a plurality of storage pools that are broken up by device type, such as a primary storage pool on disk and a backup copy pool on tape. When the storage management client sends a data object (whether it is for backup, archive, or any other purpose), it is the responsibility of the storage management system to safeguard that copy of the data. To that end, one best practice is to have the storage management system make a redundant copy of the data, which may even include moving the redundant copy off-site for disaster-recovery scenarios. Similarly, storage pools may separate sets of data from each other based on physical segmentation requirements (e.g., regulatory requirements to keep sensitive data separated within different storage pools). A primary characteristic of a storage pool, however, is that each file within a storage pool will be stored as a complete file within the storage pool.

Deduplicating storage pools (or "deduplication systems") operate by taking large data objects and breaking them up into chunks using a fixed- or variable-sized chunking algorithm, such as Rabin Fingerprinting. The chunks are then digested to generate a unique digital signature (using SHA1, for example). Furthermore, as each object is broken up, a list of chunks is maintained so that the original object can be reconstructed.

In one embodiment of the present invention, these basic chunking and digesting activities are performed as in a typical deduplication system. Instead of tracking the deduplication information for each storage pool in which the data resides, the information is tracked in an index or table at a higher level in the database of the storage management system.

Through use of the present invention, once an object has been processed, the fundamental structure of the object is changed, not merely in the scope of the individual deduplication system, but rather in the scope of the entire storage management system. Accordingly, a further aspect of the present invention eliminates the inefficiency of re-assembling and repeating deduplication of transferred data. Because deduplication information is stored above the storage pool layer, the storage management system is able to move data between storage pools at a chunk-level without having to re-chunk or re-digest each piece of data.

Similarly, once data is stored in a deduplication pool within the storage management system, it would be inefficient to recalculate the values for the various chunks of the data object when moving it to another storage pool. Thus, once the data is analyzed according to the present invention, it is analyzed forever, and all that is required to establish access to the chunks is to find matching chunks within the index.

An example operational environment for the present invention is depicted in FIG. 1, which demonstrates a storage management system 100 operating over a network 110. The storage management system 100 includes a number of storage pools 120, 130, 140 where data is stored during its normal operation within the storage management system. The storage pools include storage disks 120$a$, 120$b$, 130$a$, 130$b$, and 140$a$ accessible over the network 110.

The storage management system 100 further includes a "copy pool" 150 to contain backups of data objects that are stored in the various storage pools. The copy pool 150, which is implemented in this embodiment in the form of tape backup systems 150$a$ and 150$b$, may also be implemented by other suitable backup means.

The storage management system 100 further includes a database 160 that contains two indexes 170 and 180. Index 170 tracks the location of data objects stored throughout the storage management system 100 and thus tracks the location of specific data objects within the storage pools or copy pool. Index 180 tracks deduplication information for objects which have been deduplicated within the storage management system.

Figure 2:
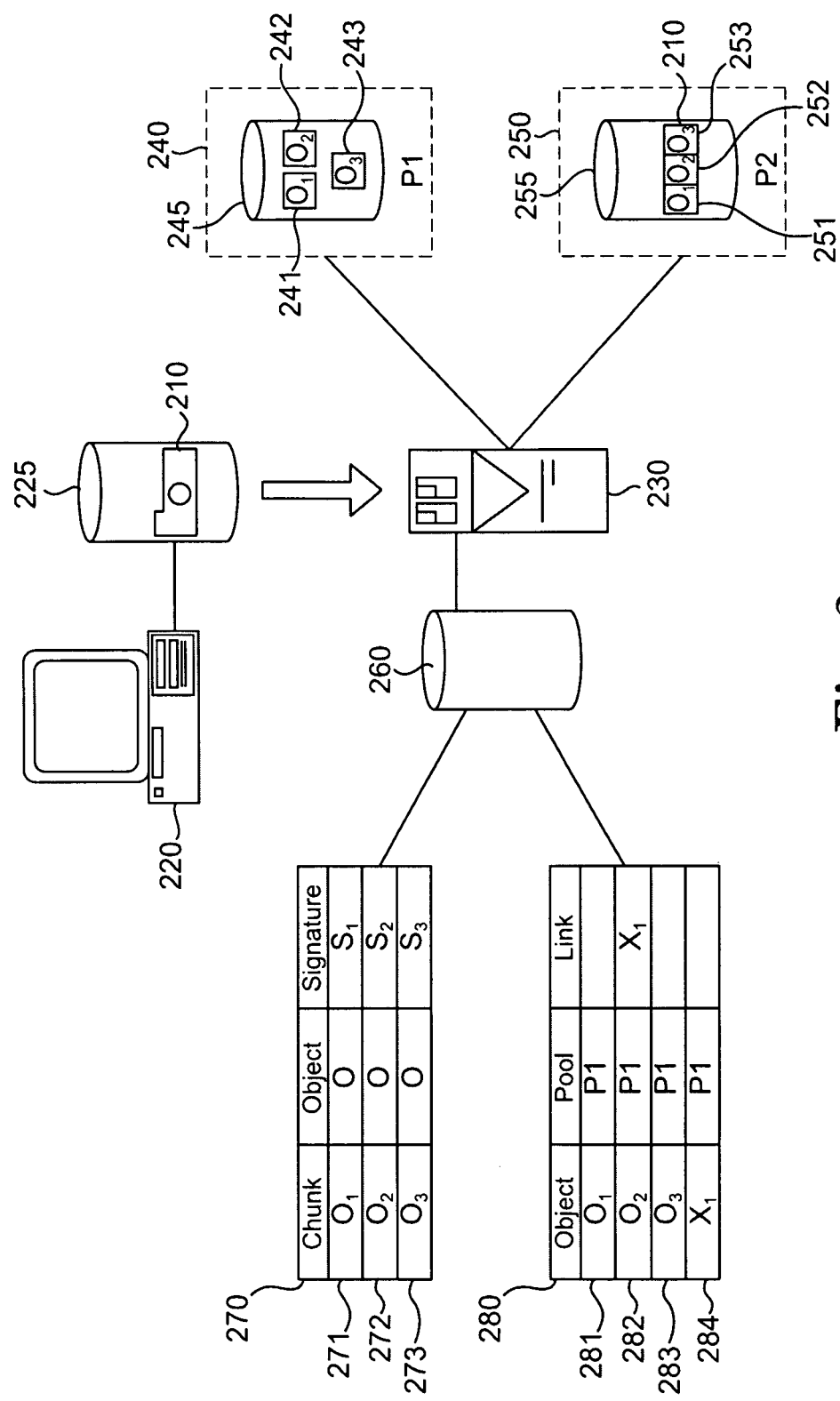
FIG. 2 illustrates an example operation of storing data on a storage management system configured to enable the transfer data between storage pools according to one embodiment of the present invention.

An example operation of storing data on a storage management system configured to enable the transfer data between storage pools according to one embodiment of the present invention is depicted in FIG. 2. As depicted, object O 210 is transferred from a volume 225 on a storage management client 220 to the storage management server 230 for storage (perhaps as a backup, archive, etc). Upon import into the storage management system, the data object 210 is intended to be stored on a volume 245 within a first storage pool P1 240 inside the storage management system. Assume that this data object O 210 is also concurrently stored on a volume 255 within a second storage pool 250 inside the storage management system, such as through the use of a simultaneous write feature that makes two or more separate copies as the data is being received by the server 230. Further assume that the first storage pool P1 240 is a deduplicating pool (i.e., performs deduplication for data objects on all volumes within its pool), and that the second storage pool P2 250 is a non-deduplicating pool.

After the data object 210 is imported into the storage management system, the data will be stored in the first storage pool P1 240 in deduplicated form and in the second storage pool P2 250 without deduplication. Although FIG. 2 suggests the deduplication process occurs during ingestion to the storage management system, the same results of this embodiment of the present invention may be achieved through use of a post-ingestion deduplication process.

As a result of deduplication on the first storage pool 240, object O becomes pieces $O_1$ 241, $O_2$ 242, and $O_3$ 243, where $O_1$ 241, $O_2$ 242, and $O_3$ 243 represent the three pieces into which object O was chunked. Accordingly, the deduplication information containing the ownership and digital signatures of the chunks are stored with an entry for each chunk in an index 270 at the storage management system level. As depicted in index 270, for each chunk $O_1$, $O_2$, and $O_3$, there are rows 271-273 to include an entry for the chunk, the object associated with the chunk, and the signature of the chunk. This deduplication information stored in index 270 can then be used to easily reassemble the object at a later time. For example, the index 270 will indicate to the storage management system that chunks $O_1$, $O_2$, and $O_3$ are necessary to reassemble object O. Additionally, this deduplication information may include the sequence number of each chunk which indicates the sequence that the chunks need to be reassembled in to successfully reassemble object O.

Even though object O has only been deduplicated within the first storage pool P1 240, the storage management system is able to easily establish that object O stored within any pool is comprised of chunks $O_1$ 241, $O_2$ 242, and $O_3$ 243. As depicted in FIG. 2, the storage management system tracks each copy of object O within the storage management system in a storage information index 280. The storage information index 280 contains an entry for each object, details of which pool the copy of the object is stored in, and linking information if the object is linked to other objects in the storage management system. Additionally, this storage information may include the number of references to the instance of the data object, and the signature of the data object.

In FIG. 2, there is a storage information index 280 further depicted containing storage information for the deduplicated data chunks. After deduplication, once object O has been broken into chunks $O_1$-$O_3$, the storage management system does not track object O as an entity in the indexes (indices) related to storage location. The storage management system does track object O at some level, because the storage management client may someday ask for object O to be retrieved. From a perspective of the object storage location, however, the storage management system tracks $O_1$-$O_3$ as individual items, in addition to reassembly information for object O.

Accordingly, as shown in the storage information index 280, there is an entry 281 for chunk $O_1$ in pool P1 240 with no link, an entry 282 for chunk $O_2$ in pool P1 240 with a link to object $X_1$, an entry 283 for chunk $O_3$ in pool P1 with no link, and an entry 284 for object $X_1$ in pool P1 with no link. In this case, object $X_1$ represents a chunk from an existing object X, previously deduplicated and stored in the storage pool.

Since pool P2 is not a deduplicating pool, there are not entries in table 280 for the objects within pool P2 250. However, as shown on volume 255 in pool P2 250, object O has been split up into chunks $O_1$-$O_3$ 251-253, although all of the chunks are stored in a contiguous fashion in the pool.

Accordingly, if deduplication is turned off in a pool, or an object is deleted from the pool, the record for the object is deleted within the object index 280, but the deduplication information for the object remains intact in the system-wide deduplication information index 270. Similarly, if deduplication is turned on in a pool again, all that needs to be done is to re-create links for the deduplicated object in the storage information index 280 from the information for the object in index 270.

As depicted in FIG. 2, to fully enable retrieval of object O from deduplicating or non-deduplicating pools, object O is mapped to objects $O_1$-$O_3$ in the system-wide database. When an attempt is issued to access object O from a storage pool, the storage information index 280 is accessed to determine if chunks $O_1$-$O_3$ are stored as objects $O_1$-$O_3$ or whether the chunks are linked to other chunks in the pool. For example, to retrieve object O from deduplicating pool P1 240, the system must retrieve objects $O_1$ 241, $X_1$ (linked by $O_2$), and $O_3$ 243. In this case, $O_2$ is not stored in the pool, so the link is followed to obtain $X_1$. In the non-deduplicating pool P2 250, however, each of the chunks $O_1$-$O_3$ 251-253 exist in the pool, and no links are involved. Because $O_1$-$O_3$ are contiguous in the non-deduplicating pool P2 250, these chunks can be retrieved in sequential order to fully retrieve object O. In contrast, for the deduplicating pool P1 240, after $O_1$ 241 is retrieved, the link is followed to retrieve $X_1$ for $O_2$ (which may even reside on a different volume), followed by returning to the first volume to retrieve $O_3$ 243. In both cases, each of the chunks $O_1$-$O_3$ are retrieved, but a deduplicating pool may involve following a link for a duplicate chunk.

As is evident, by storing deduplication information in an index or database within the storage management system, rather than at the storage pool level, the system can easily move data between pools in the storage management system. Thus, deduplication information is preserved even if the pool to/from which it is moved is not a deduplicating storage pool. One skilled in the art would recognize that there are a variety of possible configurations and database operations available to successfully track and reconfigure the relevant deduplication and storage information of the data chunks and data objects.

Figure 3:
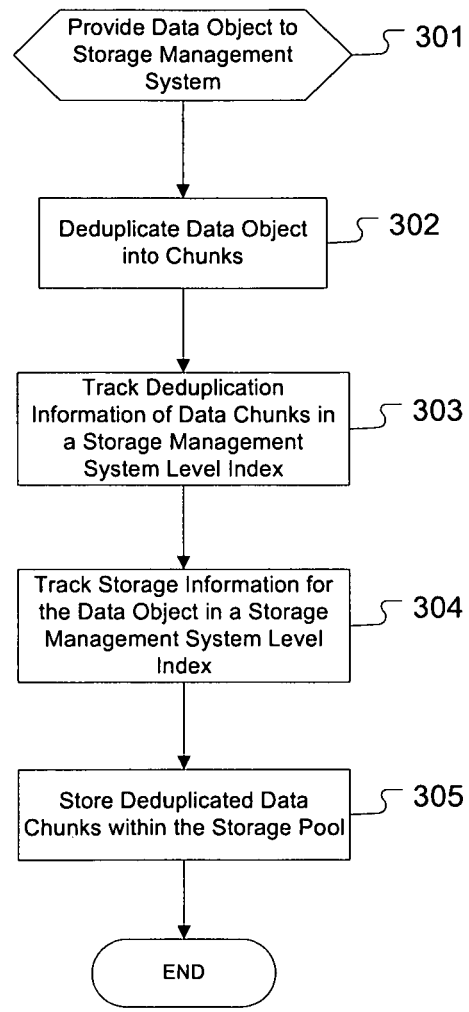
FIG. 3 illustrates a flowchart representative of an example operation of enabling the efficient transfer of deduplicated data within a storage management system according to one embodiment of the present invention.

An example operation of enabling the efficient transfer of deduplicated data within a storage management system according to one embodiment of the present invention is depicted in FIG. 3. This operation demonstrates the initial placement of deduplication and reassembly information for the data object into the deduplication information index 270, and placement of storage information for the data object's deduplicated chunks in the storage information index 280 for deduplicating pools.

First, the data object is provided to the storage management system as in step 301. Next, the data object is deduplicated into a number of chunks as in step 302. The deduplication information obtained for each of the chunks is then stored and tracked in an index located at the storage management system level as in step 303. As discussed above with reference to FIG. 2, this deduplication information may include the ownership of the chunk, the digital signature of the chunk, and the sequence of the chunk within the data object.

Additionally, the storage information for the data object is tracked in an index at the storage management system level as in 304. As also discussed above with reference to FIG. 2, this storage information may include identification of the object, identification of the object pool, number of references to the object, information to link the object to another object, and/or the signature of the object. To complete the deduplication process, the deduplicated data chunks are stored as necessary within the storage pool as in 305.

After completion of the operation depicted in FIG. 3, the data object has been analyzed and deduplicated in at least one deduplicating storage pool. It is possible that this data object is also stored in one or more non-deduplicating pools in addition to being stored within one or more deduplicating pools.

Figure 4:
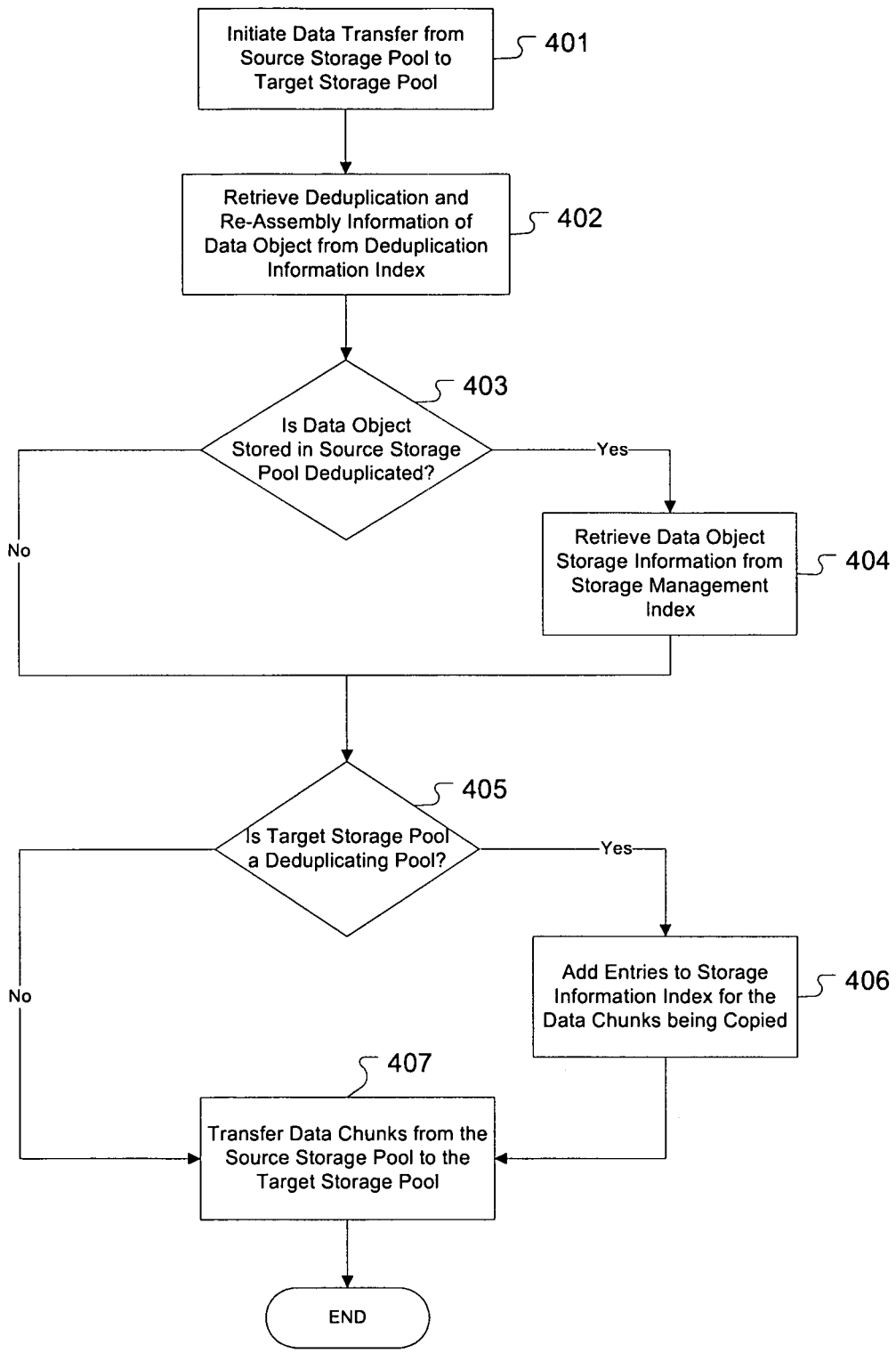
FIG. 4 illustrates a flowchart representative of an example operation of performing the efficient transfer of deduplicated data within a storage management system according to one embodiment of the present invention.

FIG. 4 depicts the operation of an efficient data transfer taking place at a later time between a source storage pool and a target storage pool within the storage management system according to a further embodiment of the present invention. This operation occurs within the storage management system after the data is deduplicated, tracked, and stored consistent with the method depicted in FIG. 3.

Although the method within FIG. 3 involves deduplicating the data object and storing it within at least one deduplicating storage pool, the efficient transfer of data between storage pools within FIG. 4 is applicable to data transfers involving any combination of deduplicated and non-deduplicated storage pools. One example scenario where a transfer from a non-deduplicated pool to a deduplicated pool would be performed is if data in the primary pool becomes damaged or inaccessible and therefore needs to be restored from a non-deduplicated copy pool. Additionally, the steps depicted in FIG. 4 can be performed multiple times, so data can be transferred among deduplicating and non-deduplicating pools in any sequence.

As shown in step 401, a data transfer is initiated from a source storage pool to a target storage pool. This data transfer may be in the form of a copy (a transfer to the target location which leaves the data object at the source location) or a move (a transfer followed by deletion of the object at the source location). Next, as in step 402, the deduplication and reassembly information of the data object is retrieved from the deduplication information index 270, even if the data transfer is occurring to or from a non-deduplicated pool.

In the case that the data object stored in the source storage pool is deduplicated per step 403, then the storage information for the deduplicated data object is retrieved from the index 280 at the storage management level as in step 404. Step 404 is not necessary for the transfer of a non-deduplicated data object, because the data chunks are stored contiguously.

It is important to note that even if the data object stored on the source storage pool is not stored in deduplicated form, the data object will still have been broken into chunks, and deduplication information for these chunks will be stored in the deduplication information index 270 at the storage management system level. All of the chunks for the data object, however, will be present and contiguous in the non-deduplicated storage pool (thereby facilitating faster retrieval of the non-deduplicated object).

Next, if the target storage pool is a deduplicating pool as in step 405 (i.e., the data transfer is taking place from a non-deduplicating pool to a deduplicating pool, or from a deduplicating pool to a deduplicating pool), the data does not need to be analyzed again, and duplicated data chunks already existing on the target storage pool do not need to be transferred from the source storage pool. The information from the deduplication information index 270 can be used to easily create the deduplicated data by establishing the necessary entries in the storage management index 280 as in step 406.

Additionally, if the target storage pool is a deduplicating pool, the storage information index 280 is examined for entries in the target storage pool to see if matching chunks already exist. If matching entries exist in the target storage pool, then the chunks are not transferred in step 407, so the entries for those chunks in the storage information index 280 will have a value in the link column. If there is no match, the chunk is copied as in step 407, and the entry for the chunk in the storage information index 280 will reflect no link. The storage management system, however, continues to track the deduplication information for the data chunks and the storage information for the data objects whether or not a data transfer ever occurs.

If the target storage pool is a non-deduplicating pool per step 405, the only operation which needs to be performed is a transfer of each of the data object's data chunks from the source storage pool (which may be either a duplicating or non-deduplicating storage pool) to the target non-deduplicating storage pool as in step 407.

As depicted in FIG. 4, deduplication may be easily performed for data that is being transferred from a non-deduplicating pool to a deduplicating pool, because the signatures of the data chunks are already tracked at the system-wide level in the deduplication information index 270. Accordingly, this embodiment allows the storage management system to bypass a deduplication analysis which would otherwise be needed to determine if duplicate chunks exist on the target volume.

The storage management system utilized in FIGS. 3 and 4 continues to track the deduplication information for the data chunks and the storage information for the data objects whether or not a data transfer of the data object ever occurs. Additionally, even if a data object is deleted from a storage pool, deduplication information is available for the object as long as it still exists in any one storage pool, and this information can be applied to all storage pools. However, once an object has been completely deleted from the storage management system, its deduplication information is removed.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Although various representative embodiments of this invention have been described above with a certain degree of particularity, those skilled in the art could make numerous alterations to the disclosed embodiments without departing from the spirit or scope of the inventive subject matter set forth in the specification and claims.

What is claimed is:

1. A method in a computer system for performing an efficient transfer of deduplicated data within a storage management system, comprising:
   deduplicating a data object within a storage management system into one or more deduplicated data chunks;
   storing the data chunks in a source storage pool, the storage management system containing a plurality of storage pools, wherein volumes of each storage pool share a characteristic and are separate from volumes of other storage pools;
   tracking a location of the data chunks in the storage pools with first entries for the data chunks in a storage index, wherein each first entry specifies each storage pool storing the associated data chunk;
   tracking deduplication information for the data chunks of the data object in a deduplication index at a storage management system level;
   adding second entries for the data chunks from the deduplication index to the storage index, if the target storage pool is deduplicated, in response to transferring the data object from the source storage pool to the target storage pool, wherein each second entry specifies that the source storage pool stores the associated data chunk; and
   transferring only each data chunk of the data object to the target storage pool that satisfies three conditions comprising the target storage pool is a deduplicating pool, the data chunk is without a first entry in the storage index specifying that the target source stores the data chunk, and a second entry for the data chunk in the storage index specifies the source storage pool stores the data chunk.

2. The method as in claim 1, wherein the deduplication information for the data object tracked in the deduplication index includes data object ownership information and a digital signature for each data chunk of the data object.

3. The method as in claim 1, wherein the storage information tracked in the storage index includes references and links to each deduplicated data chunk existent within the plurality of storage pools within the storage management system.

4. The method as in claim 1, wherein deduplication of the data object occurs during ingestion of the data object into the storage management system.

5. The method as in claim 1, wherein deduplication of the data object occurs during an operation subsequent to ingestion of the data object into the storage management system.

6. A method in a computer system for performing an efficient transfer of deduplicated data within a storage management system, comprising:
   dividing a data object within a storage management system into one or more data chunks;
   storing the one or more data chunks in a source storage pool of a plurality of storage pool within the storage management system, wherein volumes of each storage pool share a characteristic and are separate from volumes of other storage pools;
   deduplicating the one or more data chunks within one or more of the plurality of storage pools;
   tracking a location of the data chunks in the storage pools with first entries for the data chunks in a storage index, wherein each first entry specifies each storage pool storing the associated data chunk;
   tracking storage information for the data chunks of the data object in a deduplication index at a storage management system level;
   adding second entries for the data chunks from the deduplication index to the storage index if the target storage pool is deduplicated in response to transferring the data object from the source storage pool to the target storage pool, wherein each second entry specifies that the source storage pool stores the associated data chunk; and
   transferring only each data chunk of the data object to the target storage pool that satisfies three condition comprising the target storage pool is a deduplicating pool, the data chunk is without a first entry in the storage index specifying that the target source stores the data chunk, and a second entry for the data chunk in the storage index specifies the source storage pool stores the data chunk.

7. A system, comprising: at least one processor; and
   at least one memory which stores instructions operable with the at least one processor for performing an efficient transfer of de duplicated data within a storage management system, the instructions being executed for:
   deduplicating a data object within a storage management system into one or more deduplicated data chunks,
   storing the data chunks in a source storage pool, the storage management system containing a plurality of storage pools, wherein volumes of each storage pool share a characteristic and are separate from volumes of other storage pools;
   tracking a location of the data chunks in the storage pools with first entries for the data chunks in a storage index, wherein each first entry specifies each storage pool storing the associated data chunk;
   tracking deduplication information for the data chunks of the data object in a deduplication index at a storage management system level;
   adding second entries for the data chunks from the deduplication index to the storage index if the target storage pool is deduplicated in response to transferring the data object from the source storage pool to the target storage pool, wherein each second entry specifies that the source storage pool stores the associated data chunk; and
   transferring only each data chunk of the data object to the target storage pool that satisfies three conditions comprising the target storage pool is a deduplicating pool, the data chunk is without a first entry in the storage index specifying that the target source stores the data chunk, and a second entry for the data chunk in the storage index specifies the source storage pool stores the data chunk.

8. The system of claim 7, wherein the deduplication information for the data object tracked in the deduplication index includes data object ownership information and a digital signature for each data chunk of the data object.

9. The system of claim 7, wherein the storage information tracked in the storage index includes references and links to each deduplicated data chunk existent within the plurality of storage pools within the storage management system.

10. The system of claim 7, wherein deduplication of the data object occurs during ingestion of the data object into the storage management system.

11. The system of claim 7, wherein deduplication of the data object occurs during an operation subsequent to ingestion of the data object into the storage management system.

12. A system, comprising: at least one processor; and
at least one memory which stores instructions operable with the at least one processor for performing an efficient transfer of deduplicated data within a storage management system, the instructions being executed for:
dividing a data object within a storage management system into one or more data chunks;
storing the one or more data chunks onto a source storage pool of a plurality of storage pools within the storage management system, wherein volumes of each storage pool share a characteristic and are separate from volumes of other storage pools;
deduplicating the one or more data chunks within one or more of the plurality of storage pools;
tracking a location of the data chunks in the storage pools with first entries for the data chunks in a storage index, wherein each first entry specifies each storage pool storing the associated data chunk;
tracking storage information for the data chunks of the data object in a deduplication index at a storage management system level;
adding second entries for the data chunks from the deduplication index to the storage index if the target storage pool is deduplicated in response to transferring the data object from the source storage pool to the target storage pool, wherein each second entry specifies that the source storage pool stores the associated data chunk; and
transferring only each data chunk of the data object to the target storage pool that satisfies three conditions comprising the target storage pool is a deduplicating pool, the data chunk is without a first entry in the storage index specifying that the target source stores the data chunk, and a second entry for the data chunk is the storage index specifies the source storage pool stores the data chunk.

13. A computer program product comprising a non-transitory computer useable medium having a computer readable program for performing an efficient transfer of deduplicated data within a storage management system, wherein the computer readable program when executed on a computer causes the computer to:
deduplicate a data object within a storage management system into one or more deduplicated data chunks;
storing the data chunks in a source storage pool, the storage management system comprising a plurality of storage pools, wherein volumes of each storage pool share a characteristic and are separate from volumes of other storage pools;
tracking a location of the data chunks in the storage pools with first entries for the data chunks in a storage index, wherein each first entry specifies each storage pool storing the associated data chunk;
tracking deduplication information for the data chunks of the data object in a deduplication index at a storage management system level;
adding second entries for the data chunks from the deduplication index to the storage index if the target storage pool is deduplicated in response to transferring the data object from the source storage pool to the target storage pool, wherein each second entry specifies that the source storage pool stores the associated data chunk; and
transferring only each data chunk of the data object to the target storage pool that satisfies three conditions comprising the target storage pool is a deduplicating pool, the data chunk is without a first entry in the storage index specifying that the target source stores the data chunk, and a second entry for the data chunk in the storage index specifies the source storage pool stores the data chunk.

14. The computer program product of claim 13, wherein the deduplication information for the data object tracked in the deduplication index includes data object ownership information and a digital signature for each data chunk of the data object.

15. The computer program product of claim 13, wherein the storage information tracked in the storage index includes references and links to each deduplicated data chunk existent within the plurality of storage pools within the storage management system.

16. The computer program product of claim 13, wherein deduplication of the data object occurs during ingestion of the data object into the storage management system.

17. The computer program product of claim 13, wherein deduplication of the data object occurs during an operation subsequent to ingestion of the data object into the storage management system.

18. A computer program product comprising a non-transitory computer useable medium having a computer readable program for performing an efficient transfer of deduplicated data within a storage management system, wherein the computer readable program when executed on a computer causes the computer to:
divide a data object within a storage management system into one or more data chunks;
store the one or more data chunks onto a source storage pool of a plurality of storage pools within the storage management system, wherein volumes of each storage pool share a characteristic and are separate from volumes of other storage pools;
deduplicate the one or more data chunks within one or more of the plurality of storage pools;
track a location of the data chunks in the storage pools with first entries for the data chunks in a storage index, wherein each first entry specifies each storage pool storing the associated data chunk;
track storage information for the data chunks of the data object in a deduplication information index at a storage at a storage management system level;
adding second entries for the data chunks from the deduplication index to the storage index if the target storage pool is deduplicated in response to transferring the data object from the source storage pool to the target storage pool, wherein each second entry specifies that the source storage pool stores the associated data chunk; and
transferring only each data chunk of the data object to the target storage pool that satisfies three conditions comprising the target storage pool is a deduplicating pool, the data chunk is without a first entry in the storage index specifying that the target source stores the data chunk, and a second entry for the data chunk in the storage index specifies the source storage pool stores the data chunk.

* * * * *